(12) United States Patent
Kim et al.

(10) Patent No.: US 8,352,230 B2
(45) Date of Patent: Jan. 8, 2013

(54) INTEGRATED FRAMEWORK FOR FINITE-ELEMENT METHODS FOR PACKAGE, DEVICE AND CIRCUIT CO-DESIGN

(75) Inventors: Keunwoo Kim, Somers, NY (US); Soojae Park, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 354 days.

(21) Appl. No.: 12/723,130

(22) Filed: Mar. 12, 2010

(65) Prior Publication Data

US 2011/0224951 A1 Sep. 15, 2011

(51) Int. Cl.
*G06F 17/50* (2006.01)
*G06G 7/62* (2006.01)

(52) U.S. Cl. ............................ 703/13; 716/100; 716/136

(58) Field of Classification Search .................. 703/6, 13
See application file for complete search history.

(56) References Cited

U.S. PATENT DOCUMENTS

| | | | | |
|---|---|---|---|---|
| 5,291,419 | A * | 3/1994 | Satoh et al. | 702/34 |
| 5,579,249 | A * | 11/1996 | Edwards | 703/2 |
| 7,401,304 | B2 * | 7/2008 | Li et al. | 716/111 |
| 7,467,076 | B2 * | 12/2008 | Sakai | 703/13 |
| 7,472,363 | B1 * | 12/2008 | Chandra | 716/106 |
| 7,689,945 | B2 * | 3/2010 | Hillman et al. | 716/136 |
| 8,201,113 | B2 * | 6/2012 | Pramono et al. | 716/100 |

OTHER PUBLICATIONS

Tan et al, "3D Circuit Model for 3D IC Reliability Study", 10th Int. Conf. on Thermal, Mechanical and Multiphysics Simulation and Experiments in Micro-Electronics and Micro-Systems, 2009.*
Bart et al, Coupled Package-Device Modeling for MEMS, Technical Proceedings of the 1999 International Conference on Modeling and Simulation of Microsystems, Chapter 7, pp. 232-236, 1999.*
Biswas et al, "The 1st Level Solder Joint Reliability Co-Design for Larger Die Flip Chip Package", 9th Electronics Packaging Technology Conference, 2007.*
Leung et al, "System-in-Package (SiP) Design: Issues, Approaches and Solutions", International Conference on Electronic Materials and Packaging, 2006.*
Simulia, Realistic Simulation and 3D analysis, Dassault Systemes, http://www.3ds.com/products/simulia/overview/, p. 1, printed Feb. 18, 2010.
Sentaurus Device, An advanced multidimensional (1D/2D/3D) device simulator, http://www.synopsys.com/Tools/TCAD/DeviceSimulation/Pages/SentaurusDevice.aspx, pp. 1-2, printed Feb. 18, 2010.
Ansys, 12.1 Release, Multiphysics Solutions, 2009, pp. 1-4.

* cited by examiner

*Primary Examiner* — Mary C Jacob
(74) *Attorney, Agent, or Firm* — Ryan, Mason & Lewis, LLP (57) ABSTRACT

Electrical finite element analysis is carried out on a circuit design, which includes devices, to determine an acceptable power-performance envelope and to obtain data for circuit temperature mapping. A circuit temperature map is developed for the circuit design, based on the data for circuit temperature mapping. Thermo-mechanical finite element analysis is carried out on a package design for the circuit design, based on the circuit temperature map, to determine a package reliability limit based on thermal stress considerations. It is determined whether the package design and the circuit design jointly satisfy: (i) power-performance conditions specified in the acceptable power-performance envelope; and (ii) the package reliability limit based on the thermal stress considerations.

19 Claims, 9 Drawing Sheets

FEM STRESS ANALYSIS

FIG. 6
FEM STRESS ANALYSIS

TEMPERATURE MAP BASED ON 180nm SoC DESIGN (H. STOLBERG et. Al., ISSCC, 2004)

FIG. 9

INTEGRATED FRAMEWORK FOR FINITE-ELEMENT METHODS FOR PACKAGE, DEVICE AND CIRCUIT CO-DESIGN

FIELD OF THE INVENTION

The present invention relates to the electrical and electronic and computer arts, and, more particularly, to computer-aided design of electronic circuitry and the like.

BACKGROUND OF THE INVENTION

Because of device scaling, increased circuit functionalities, and increased chip area, managing the chip temperature is one of the major challenges to optimize the package system and prevent failure of a thermally-stressed area. Current finite element methods include thermal analysis for the package system using mechanical partial differential equations, device design and analysis using electrical and/or physical partial differential equations, and circuit-level analysis by device and/or circuit mix-mode simulations

SUMMARY OF THE INVENTION

Principles of the invention provide an integrated framework for finite-element methods for package, device and circuit co-design. In one aspect, an exemplary method includes the steps of carrying out electrical finite element analysis on a circuit design, the circuit design including devices, to determine an acceptable power-performance envelope and obtain data for circuit temperature mapping; developing a circuit temperature map for the circuit design, based on the data for circuit temperature mapping; and carrying out thermo-mechanical finite element analysis on a package design for the circuit design, based on the circuit temperature map, to determine a package reliability limit based on thermal stress considerations. A further step includes determining whether the package design and the circuit design jointly satisfy: (i) power-performance conditions specified in the acceptable power-performance envelope; and (ii) the package reliability limit based on the thermal stress considerations.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed.

One or more embodiments of the invention or elements thereof can be implemented in the form of a computer product including a computer readable storage medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

One or more embodiments of the invention may offer one or more of the following technical benefits:
- greater accuracy in device, circuit, and packaging analysis and design as compared to conventional methods such as the SPICE program;
- reduced number of fabrication cycles due to greater accuracy; and
- even though more computer time may be required for the analysis stage, the overall (analysis and design plus fabrication) cost and/or time are reduced.

These and other features, aspects and advantages of the invention will become apparent from the following detailed description of illustrative embodiments thereof, which is to be read in connection with the accompanying drawings.

DETAILED DESCRIPTION OF PREFERRED EMBODIMENTS

Because of device scaling, increased circuit functionalities, and increased chip area, managing the chip temperature is one of the major challenges to optimize the package system and prevent the failure of thermally-stressed areas. In accordance with one or more embodiments of the invention, diligent and smart methods using fully-physical and software-based integrated finite-element tools in package, device, and circuit levels can significantly improve package-for-manufacturing by co-optimizing overall chip performance, power, yield, and the package system.

Current finite element methods include thermal analysis for the package system using mechanical partial differential equations, device design and analysis using electrical and/or physical partial differential equations, and circuit-level analysis by device and/or circuit mix-mode simulations.

In accordance with one or more embodiments of the invention, integrated finite element methods (also referred to as a framework of electro-thermal analysis for package and/or chip co-design) address one or more significant issues without expensive hardware testing and measurement cycles.

Figure 1:
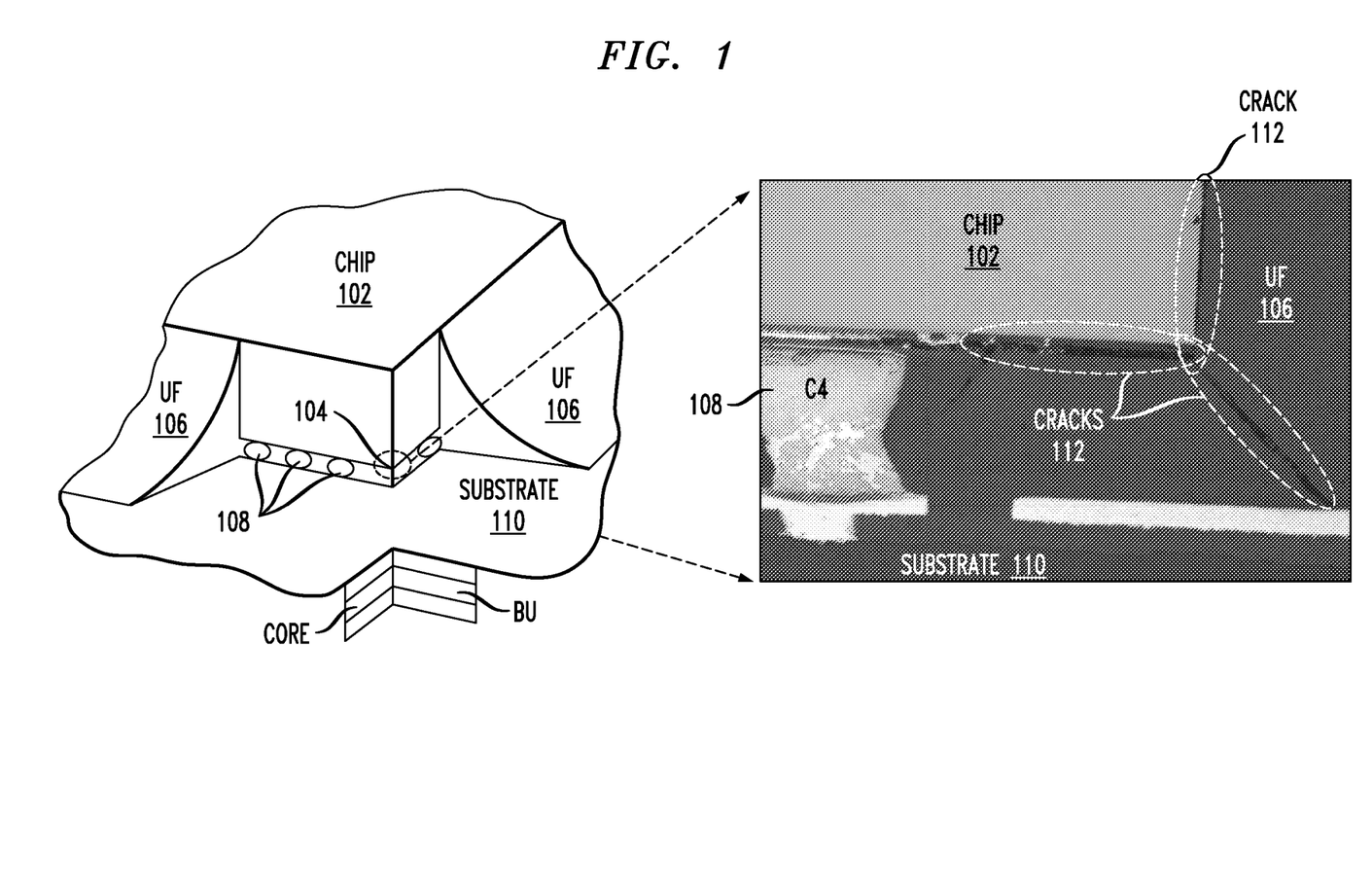
FIG. 1 shows exemplary issues with underfill-solder joint reliability.

Referring now to FIG. 1, one non-limiting example of a significant package issue is underfill-solder joint reliability. Chip corner cracking is a failure mode for organic packages.

Note chip 102 with corner 104 and underfill (UF) 106. Underfill 106 at chip corner 104 fails at low temperatures and high stress during thermal and/or power cycling, which is followed by failure of solder joint (C4—Controlled Collapse Chip Connection or so-called "flip chip") 108. A substrate 110 may include a core and build-up (BU) not separately numbered. Cracks 112 are seen in the photomicrograph at the right. Reducing stress at UF 106 enhances package reliability and/or lifetime.

Figure 2:
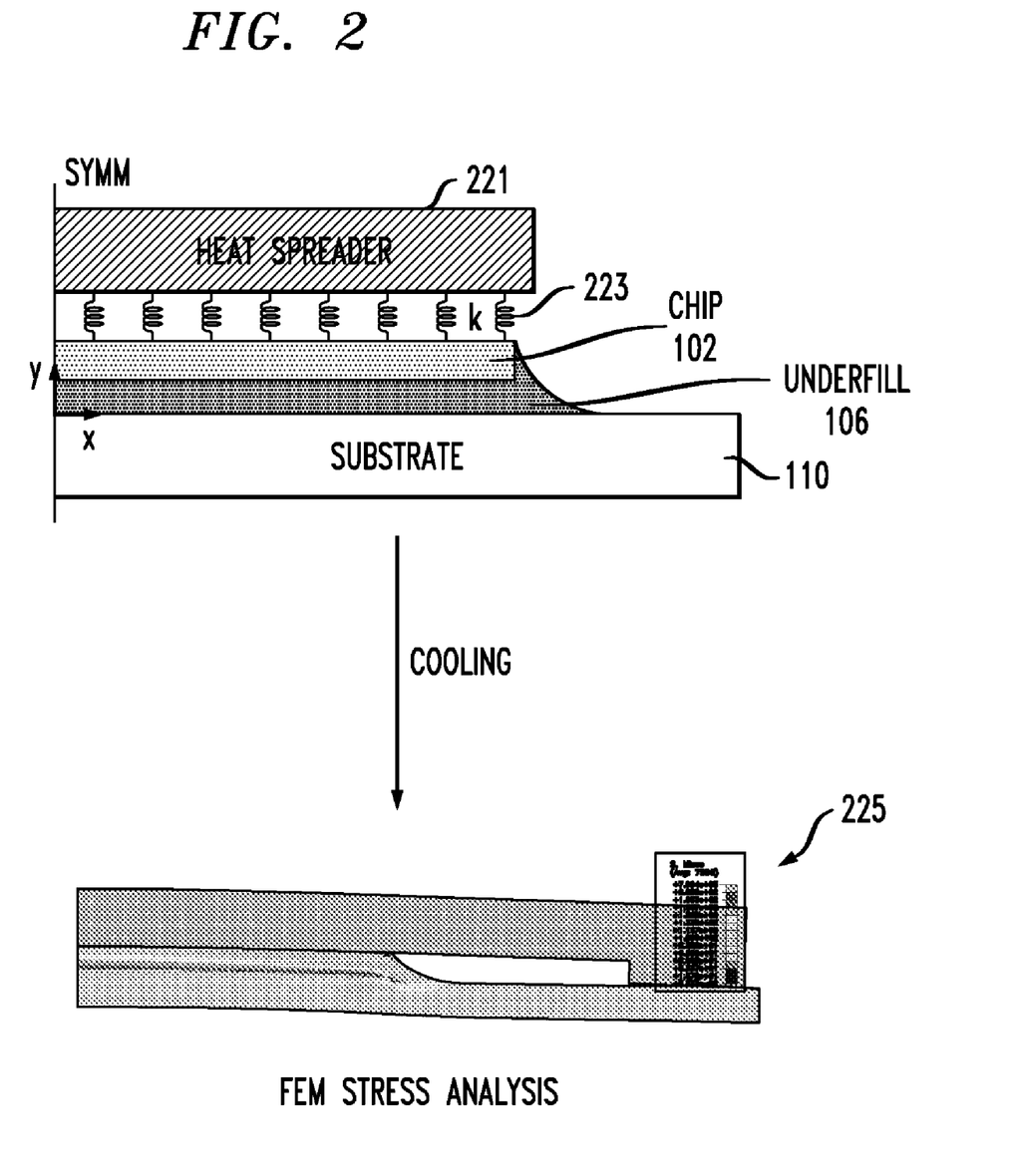
FIG. 2 shows exemplary thermal stress during temperature change.

Turning now to FIG. 2, another significant package issue is thermal stress during temperature change. Substrate materials expand and contract about ten times more than silicon during temperature change, due to different coefficients of thermal expansion. This creates warpage and/or bending of the package, increases thermal stress, and causes package materials to fail. Thermal stress is proportional to temperature change so a number of current techniques have sought to minimize temperature change. One or more embodiments of the invention advantageously take into account the local temperature variation effect on thermal stress. Elements in FIG. 2 similar to those in FIG. 1 have received the same reference character and will not be described again. A heat spreader 221 is provided for thermal control of the chip. Springs 223 represent thermal interface material between the chip and the heat spreader. They provide the mechanical coupling and k is the stiffness of the thermal interface material. A finite element stress analysis depicting the stress resulting from differential thermal expansion is shown at 225.

Figure 3:
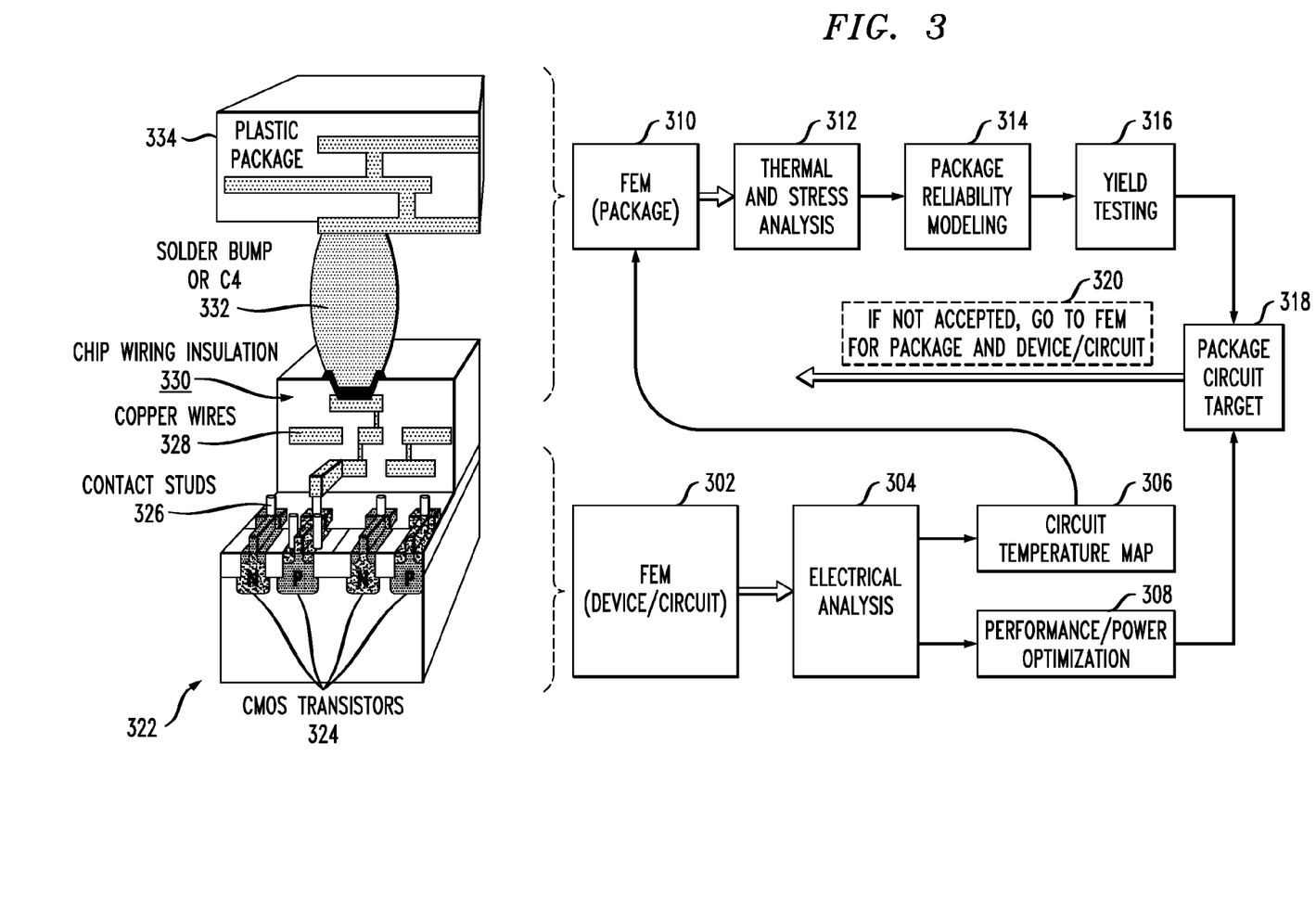
FIG. 3 shows a block diagram and flow chart of an exemplary integrated finite element tool, according to an aspect of the invention, and showing an exemplary physical system which may be analyzed therewith.

FIG. 3 shows a block diagram and flow chart of an exemplary integrated finite element tool, according to an aspect of the invention, and showing an exemplary physical system 322 which may be analyzed therewith. Initially, develop a layout for a tentative design (e.g., for a circuit and package). Develop a finite element device and/or circuit model in block 302, and carry out electrical analysis with same in block 304 to determine how the circuit will perform electrically and where the power dissipation will take place (as well as how much power will be dissipated). The power can be determined by solving the electrical models for voltage and current. The results of the analysis lead to a circuit temperature map 306, since the temperatures can be solved for given the power dissipation values and locations, and the boundary conditions. The electrical analysis 304 can also be used to carry out performance and/or power optimization in block 308 (refer, e.g., to discussion of performance-power tradeoff in FIG. 4 and its accompanying description, below).

The circuit temperature map 306 is taken as an input to a thermal-mechanical finite element package model 310. Thermal and stress analyses are performed, as per block 312, which allows package reliability modeling in block 314. For example, determine the thermal stress caused by the differences in the coefficient of thermal expansion. S-N curves (with Miner's rule or the like as needed) can then be used to determine the number of cycles of thermal stress which can be tolerated before failure, which will allow prediction of the lifetime of the circuit.

Yield testing can also be carried out as in block 316. In one or more embodiments, block 316 represents actual physical laboratory experimentation. In other instances, computer simulation of the fabrication process can be employed based on modeling with finite elements and/or probabilistic Monte Carlo techniques, to predict the yield that will be obtained when actually fabricating a physical circuit and/or package.

In block 318, determine if the proposed design meets power, performance, and thermal stress criteria (and optionally, yield criteria). If yes, proceed to fabrication; if no, redesign and repeat the FEM analyses, as at 320.

System 322 shows an exemplary design being analyzed, including a circuit with CMOS transistors 324, contact studs 326, copper wiring 328, and chip wiring insulation 330. The circuit and devices may be analyzed with model 302. Note also solder bump or C4 332 and package 334, which may be analyzed with model 310.

Technology Computer-Aided Design (TCAD) refers to the use of computer simulations to develop and optimize semiconductor processing technologies and devices. Synopsys TCAD software, available from Synopsys, Inc. Mountain View, Calif., USA, is a non-limiting example of software that could be used to carry out the portions depicted in blocks 302, 304. Furthermore, model 302 may include capability beyond finite element solution of field equations; for example, device modeling capability such as in the well-known SPICE computer program. One or more embodiments focus on very large scale integration (VLSI) chip design.

Note that the run time for carrying analysis according to one or more embodiments of the invention may be on the order of one to two hours, as compared to seconds or minutes for SPICE-type simulations. However, even though the design cycle according to one or more embodiments of the invention may be longer than prior art techniques, the greater accuracy achieved allows reducing one or both of overall cost and overall time (overall in this context including both the design and fabrication cycles).

Figure 4:
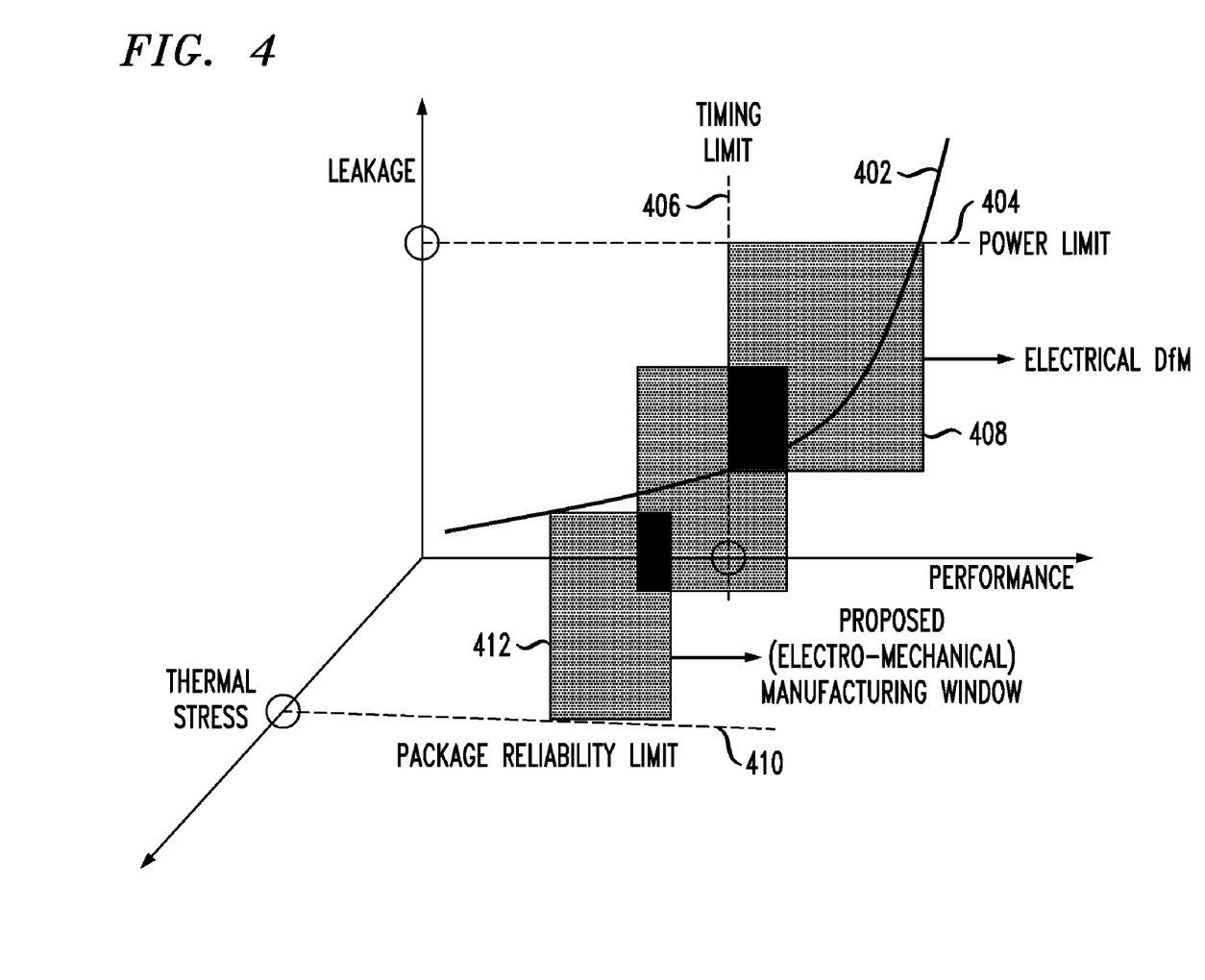
FIG. 4 presents a graph of exemplary considerations in chip-package co-design for manufacturing.

FIG. 4 presents a graph of exemplary considerations in chip-package co-design for manufacturing. Note the vertical ("y") axis (leakage) and horizontal ("x") axis (performance) with trade-off curve 402. The leakage contributes to the power consumption. The maximum allowable power dissipation is shown at 404. Furthermore, to ensure adequate performance, the timing limit 406 must be complied with; i.e., line 406 represents minimum allowable performance. Box 408, "Electrical DfM (design for manufacturing)" shows the allowable envelope to comply with the power and performance requirements. Consider also the "thermal stress" ("z") axis (coming up out of the paper). Knowing the required number of thermal stress cycles for the desired lifetime, using S-N curves (with Miner's rule or the like as needed), the maximum allowable thermal stress that can be tolerated is plotted as package reliability limit 410. This leads to a three-dimensional electro-mechanical manufacturing window 412 wherein the performance, leakage, and thermal stress criteria are all satisfied. The package reliability limit can be obtained by thermo-mechanical finite element analysis on the package, while the power and performance limits can be obtained by electrical finite element analysis on the devices and the circuit.

Figure 5:
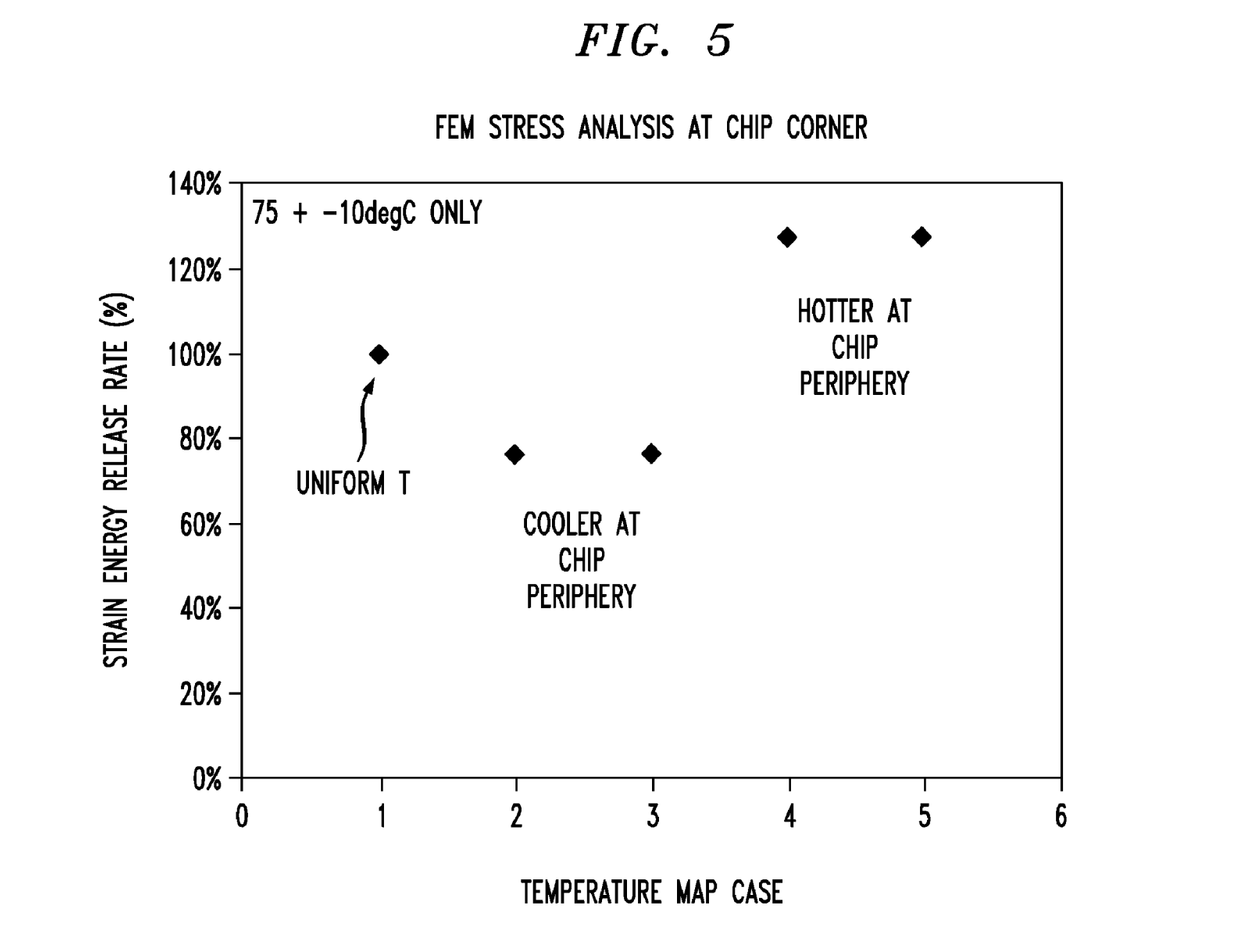
FIG. 5 depicts exemplary stress reduction via optimal design.
Figure 6:
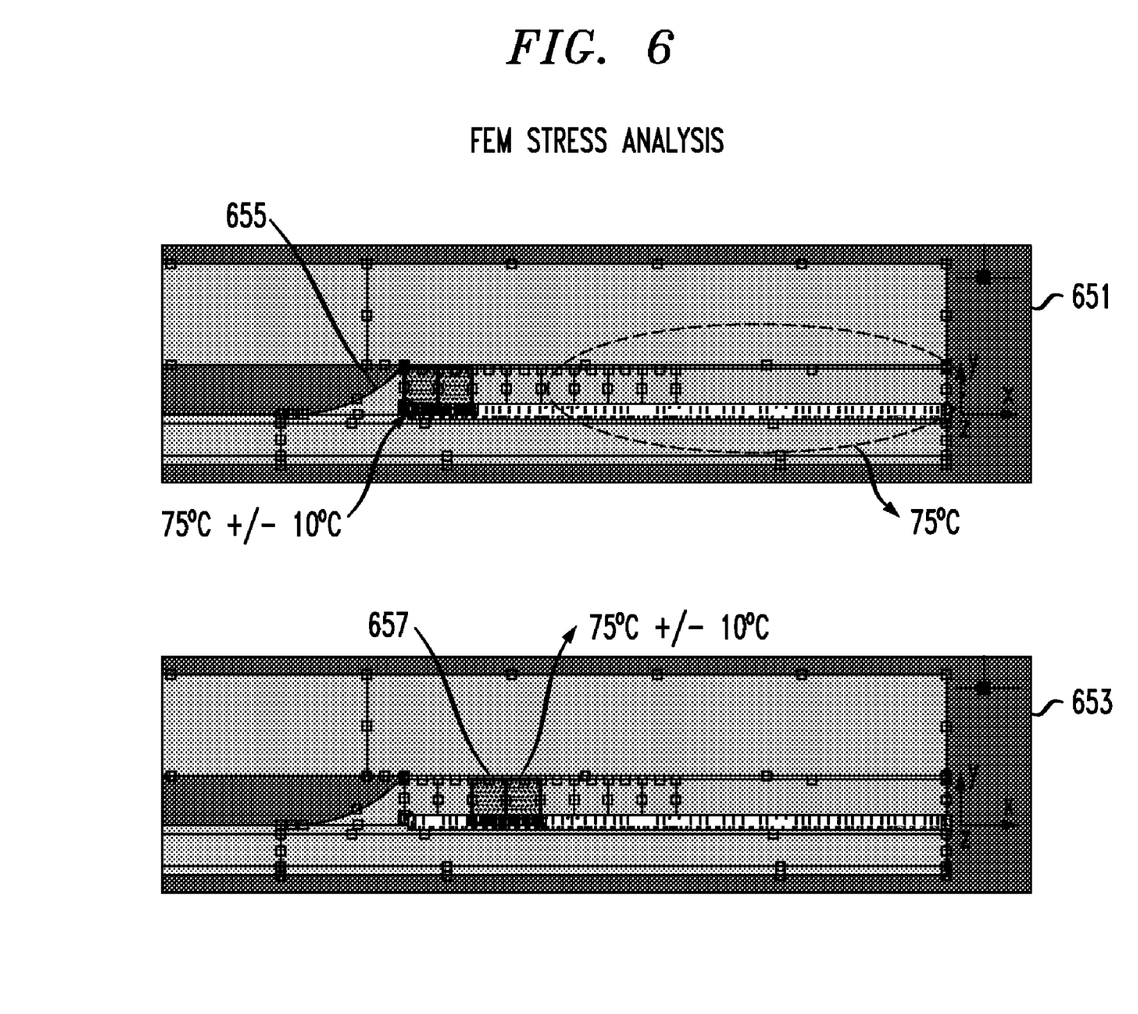
FIG. 6 shows an exemplary temperature map reducing chip corner stress.

FIG. 6 shows temperature maps 651 and 653 with two local regions 655, 657 under different temperatures (65 & 85° C.). Temperature mapping can be used to reduce chip corner stress. The results depicted are preliminary, two-dimensional, exemplary and non-limiting. Local temperatures were varied by 10° C. while the average temperature is 75° C. The local temperatures are 85° C. in 655 and 65° C. in 657 in FIG. 6. Relative strain energy release rate was calculated and compared in FIG. 5. There is a large difference in strain energy release rate when different local temperatures are applied to the package. This shows that the package stress can be reduced by applying an optimum temperature map in terms of package thermo-mechanical failures. FIG. 5 demonstrates that the location of high-temperature or variable temperature regions may be significant in reducing thermal stress induced failures at the chip corner.

In particular, FIG. 5 depicts considerations in stress reduction via optimal design. Chip corner stress can be reduced by temperature and/or power redistribution. Stress under power cycles ($T_{max}$=75° C., $T_{min}$=room temperature) was calculated using the finite element method. In a non-limiting example, $T_{max}$=85 & 65° C. were considered while keeping the average temperature the same in the chip. It was determined that a 24% strain energy release rate (~stress) reduction is feasible even under +/−10° C. variation in temperature. This reduction can significantly increase package lifetime; in some cases, by about 100% or so, based on considerations as per FIGS. 3 and 4 above. Strain energy release rate equals crack driving force, as is often used) is a measure of the stress applied to a material at crack tips as a fracture mechanics approach. It is proportional to stress in general. In a package, strain energy release rate greatly depends on the Young's modulus and the coefficient of thermal expansion (CTE) and geometry and/or dimensions as well. Temperature mapping is thus significant.

Figure 7:
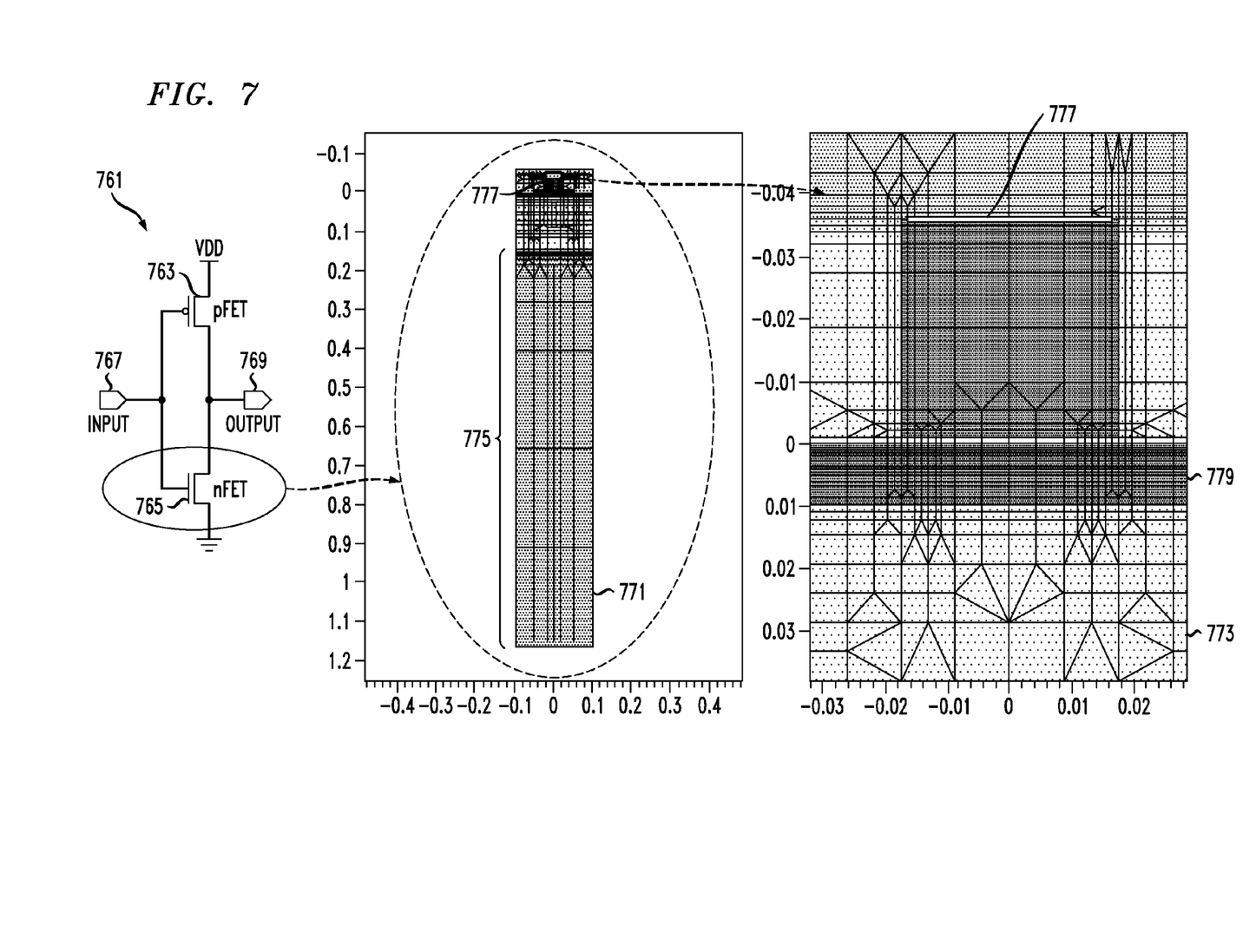
FIG. 7 shows exemplary device and circuit electrical analysis.

FIG. 7 depicts exemplary electrical analysis, namely, device and circuit analysis. A finite element method is used for device and circuit simulations by solving three partial differential equations (i.e., Poisson's, current, and continuity equations). The circuit to be simulated is a CMOS inverter 761 including a p-type MOSFET 763, an n-type MOSFET 765, an input terminal 767, and an output terminal 769. A finite element model of the NFET 765 is built with results at 771 and a detail thereof at 773. Region 775 is substrate silicon and so can be modeled with a coarse mesh for electrical purposes. Region 777 models the gate and so a fine mesh is used. Region 779 represents the transistor body and so a fine mesh is used.

Figure 8:
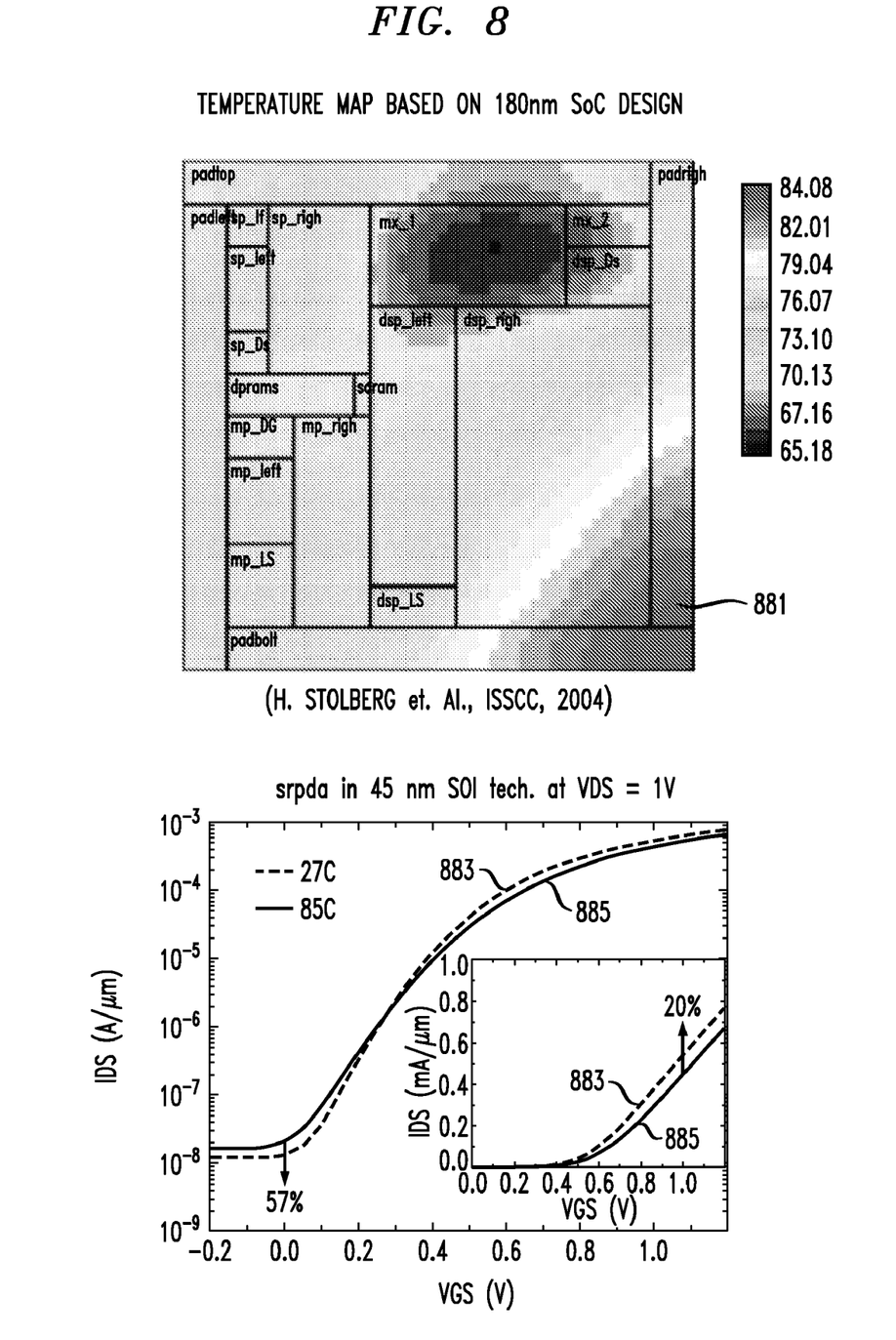
FIG. 8 shows exemplary thermal map-based electrical analysis.

FIG. 8 depicts exemplary thermal map-based electrical analysis. At the left is a temperature map 881 based on an exemplary 180 nm SoC (system on a chip) design. For lower temperatures (curve 883 as compared to curve 885), the leakage current (or power) is reduced due to the steeper subthreshold swing, but the on-state current (or, performance) is increased due to the enhanced carrier mobility. It will thus be seen that integrated package, device, and circuit analysis can offer optimal chip and package co-design results.

One or more embodiments thus provide integrated finite element method in package, device, and circuit designs; including self-consistent methods for thermal, mechanical, and electrical effects in package, device, and circuit levels; optimal chip and package co-design methods to analyze the interaction among temperature, stress, electrical transport, and circuit performance and/or power from package level all the way to the circuit and system level; and/or techniques to improve package reliability using temperature modeling.

Given the discussion thus far, it will be appreciated that, in general terms, an exemplary method, according to an aspect of the invention, include the step of carrying out electrical finite element analysis on a circuit design 322, as shown at 302, 304. The circuit design includes devices. The analysis is conducted to determine an acceptable power-performance envelope, as at 308, and to obtain data for circuit temperature mapping. The latter data includes power dissipation, which together with the boundary conditions is input to a thermal analyzer to obtain the temperature map. The temperature map is input to block 310 to determine the resulting thermal stresses when cycling back and forth between different thermal states. The thermal map can be generated in conjunction with the electrical analysis 304 and provided as an input to the package thermal and stress analysis 310, 312. In an alternative, the power dissipations and boundary conditions are provided to block 310 and the thermal map is generated therein for purposes of carrying out the thermal stress analysis. Thus, an additional step includes developing a circuit temperature map 306 for the circuit design, based on the data for circuit temperature mapping. Another step, as at 310, 312, includes carrying out thermo-mechanical finite element analysis on a package design for the circuit design, based on the circuit temperature map, to determine a package reliability limit based on thermal stress considerations, as at 314. A further step, as at 318, includes determining whether the package design and the circuit design jointly satisfy: (i) power-performance conditions specified in the acceptable power-performance envelope; and (ii) the package reliability limit based on the thermal stress considerations.

If the package design and the circuit design jointly satisfy the power-performance conditions and the package reliability limit, the package design and the circuit design could be fabricated.

If the package design and the circuit design do not jointly satisfy the power-performance conditions and the package reliability limit, one possible response, as at 320, is to repeat the steps on a revised circuit design and/or a revised package design until a satisfactory result is achieved.

In some instances, when the steps are repeated at least for a revised circuit design, the revisions to the revised circuit design could be carried out, for example, to reduce temperature excursions at the periphery of the chip, as described, for example, with respect to FIGS. 5 and 6. Advantageously, one or more embodiments allow early-on prediction of package level problems and the opportunity to compensate the circuit (electrical) performance to reduce or eliminate potential package problems (for example, by cutting back slightly on electrical performance).

In general, the two FEM models may use the same or different mesh, but in most cases, a different mesh is used for electrical and thermal/stress modeling since the high gradients in the fields could be different for different phenomena.

In one or more embodiments, rather than considering a bulk temperature change wherein the entire system is isothermal at a first temperature and then cycles to become isothermal at a different temperature, one or more embodiments, in the step of carrying out the thermo-mechanical finite element analysis, take into account local temperature fields.

Block 302 could be realized, for example, within a device and circuit finite element analysis module. Block 310 could be realized, for example, within a thermo-mechanical finite element analysis module. The electrical finite element analysis can be carried out by the device and circuit finite element analysis module executing on at least one hardware processor. The development of the circuit temperature map is carried out by a circuit temperature mapping module executing on the at least one hardware processor. The circuit temperature mapping module takes the power dissipations from 302, 304 and the boundary conditions as an input, and outputs the thermal map to be used for the thermal and stress analysis. The circuit temperature mapping module can be within the device and circuit modeler 302, 304, the thermal-structural package modeler 310, 312, or can be a separate module. The thermo-mechanical finite element analysis can be carried out by the thermo-mechanical finite element analysis module executing on the at least one hardware processor. The determining whether the package design and the circuit design jointly satisfy conditions (i) and (ii) can be carried out by a human operator facilitated by textual and/or graphical display of the analytical results.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 9:
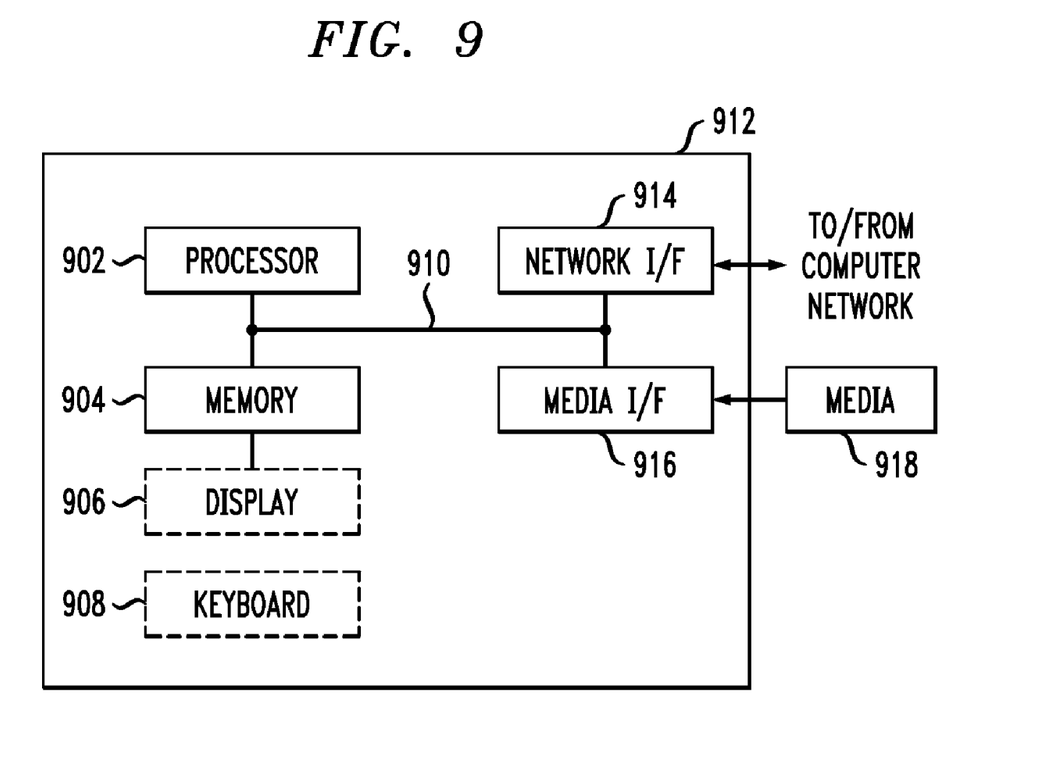
FIG. 9 depicts a computer system that may be useful in implementing one or more aspects and/or elements of the invention.

One or more embodiments can make use of software running on a general purpose computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 902, memory 904, and input/output interface such as display 906 and keyboard 908 can be interconnected, for example, via bus 910 as part of a data processing unit 912. Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 918 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams of FIG. 3; by way of example and not limitation, a device-circuit finite element modeling module and a package finite element modeling module. A circuit temperature mapping module can also be included; the same takes the power dissipations from 302, 304 and the boundary conditions as an input, and outputs the thermal map to be used for the thermal and stress analysis. The circuit temperature mapping module can be within the device-circuit finite element modeling module and/or the package finite element modeling module, or can be a stand-alone module. As used herein, including the claims, a distinct software module, in connection with the temperature mapping module, is intended to encompass any of the cases mentioned in the preceding sentence. The method steps can then be carried out using the distinct software module(s) and/or sub-modules of the system, as described above, executing on one or more hardware processors 902. Further, a computer program product can include a computer-readable storage medium with code adapted to be implemented to carry out one or more method steps described herein, including the provision of the system with the distinct software modules. Yet further, the data manipulated in the blocks in FIG. 4 is representative of physical devices, circuits, and packages.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
 carrying out electrical finite element analysis on a circuit design, said circuit design including devices, to determine an power-performance envelope and obtain data for circuit temperature mapping;
 developing a circuit temperature map for said circuit design, based on said data for circuit temperature mapping;
 carrying out thermo-mechanical finite element analysis on a package design for said circuit design, based on said circuit temperature map, to determine a package reliability limit based on thermal stress considerations; and
 determining, using said power-performance envelope and said package reliability limit, whether said package design and said circuit design jointly satisfy:
  power-performance conditions specified in said power-performance envelope; and
  said package reliability limit based on said thermal stress considerations.

2. The method of claim 1, further comprising, if said package design and said circuit design jointly satisfy said power-performance conditions and said package reliability limit, fabricating said package design and said circuit design.

3. The method of claim 1, further comprising, if said package design and said circuit design do not jointly satisfy said power-performance conditions and said package reliability limit, repeating said steps on at least one of a revised circuit design and a revised package design until a satisfactory result is achieved.

4. The method of claim 3, wherein said repeating of said steps is carried out for at least said revised circuit design, and wherein said revised circuit design is revised to reduce temperature excursions at a periphery of said chip.

5. The method of claim 1, wherein, in said step of carrying out said thermo-mechanical finite element analysis, said thermal stress considerations take into account local temperature fields.

6. The method of claim 1, further comprising providing a system, wherein the system comprises distinct software modules, each of the distinct software modules being embodied on a computer-readable storage medium, and wherein the distinct software modules comprise a device and circuit finite element analysis module, a circuit temperature mapping module, and a thermo-mechanical finite element analysis module;
wherein:
said electrical finite element analysis is carried out by said device and circuit finite element analysis module executing on at least one hardware processor;
said development of said circuit temperature map is carried out by said circuit temperature mapping module executing on said at least one hardware processor,
said thermo-mechanical finite element analysis is carried out by said thermo-mechanical finite element analysis module executing on said at least one hardware processor; and
said determining is facilitated by at least one of textual and graphical display of results of said electrical finite element analysis and said thermo-mechanical finite element analysis.

7. A computer program product comprising a tangible computer readable recordable storage medium having computer readable program code embodied therewith, said computer readable program code comprising:
computer readable program code configured to carry out electrical finite element analysis on a circuit design, said circuit design including devices, to determine an power-performance envelope and obtain data for circuit temperature mapping;
computer readable program code configured to develop a circuit temperature map for said circuit design, based on said data for circuit temperature mapping;
computer readable program code configured to carry out thermo-mechanical finite element analysis on a package design for said circuit design, based on said circuit temperature map, to determine a package reliability limit based on thermal stress considerations; and
computer readable program code configured to determine, using said power-performance envelope and said package reliability limit, whether said package design and said circuit design jointly satisfy:
power-performance conditions specified in said acceptable power-performance envelope; and
said package reliability limit based on said thermal stress considerations.

8. The computer program product of claim 7, further comprising computer readable program code configured to, if said package design and said circuit design do not jointly satisfy said power-performance conditions and said package reliability limit, repeat said steps on at least one of a revised circuit design and a revised package design until a satisfactory result is achieved.

9. The computer program product of claim 8, wherein said computer readable program code configured to repeat said steps carries out said repetition for at least said revised circuit design, and wherein said revised circuit design is revised to reduce temperature excursions at a periphery of said chip.

10. The computer program product of claim 7, wherein, in said computer readable program code configured to carry out said thermo-mechanical finite element analysis, said thermal stress considerations take into account local temperature fields.

11. An apparatus comprising:
a memory; and
at least one processor, coupled to said memory, and operative to:
carry out electrical finite element analysis on a circuit design, said circuit design including devices, to determine an power-performance envelope and obtain data for circuit temperature mapping;
develop a circuit temperature map for said circuit design, based on said data for circuit temperature mapping;
carry out thermo-mechanical finite element analysis on a package design for said circuit design, based on said circuit temperature map, to determine a package reliability limit based on thermal stress considerations; and
determining, using said power-performance envelope and said package reliability limit, whether said package design and said circuit design jointly satisfy:
power-performance conditions specified in said power-performance envelope; and
said package reliability limit based on said thermal stress considerations.

12. The apparatus of claim 11, wherein said at least one processor is further operative to, if said package design and said circuit design do not jointly satisfy said power-performance conditions and said package reliability limit, repeat said steps on at least one of a revised circuit design and a revised package design until a satisfactory result is achieved.

13. The apparatus of claim 12, wherein said at least one processor repeats said steps for at least said revised circuit design, and wherein said revised circuit design is revised to reduce temperature excursions at a periphery of said chip.

14. The apparatus of claim 11, wherein, when said at least one processor carries out said thermo-mechanical finite element analysis, said thermal stress considerations take into account local temperature fields.

15. The apparatus of claim 11, further comprising a plurality of distinct software modules, each of the distinct software modules being embodied on a computer-readable storage medium, and wherein the distinct software modules comprise a device and circuit finite element analysis module, a circuit temperature mapping module, and a thermo-mechanical finite element analysis module;
wherein:
said at least one processor is operative to carry out said electrical finite element analysis by executing said device and circuit finite element analysis module;

said at least one processor is operative to carry out said development of said circuit temperature map by executing said circuit temperature mapping module; and said at least one processor is operative to carry out said thermo-mechanical finite element analysis by executing said thermo-mechanical finite element analysis module.

16. An apparatus comprising:

means for carrying out electrical finite element analysis on a circuit design, said circuit design including devices, to determine an power-performance envelope and obtain data for circuit temperature mapping;

means for developing a circuit temperature map for said circuit design, based on said data for circuit temperature mapping;

means for carrying out thermo-mechanical finite element analysis on a package design for said circuit design, based on said circuit temperature map, to determine a package reliability limit based on thermal stress considerations; and means for facilitating means for determining, using said power-performance envelope and said package reliability limit, whether said package design and said circuit design jointly satisfy:

power-performance conditions specified in said power-performance envelope; and said package reliability limit based on said thermal stress considerations.

17. The apparatus of claim 16, further comprising means for, if said package design and said circuit design do not jointly satisfy said power-performance conditions and said package reliability limit, repeating said steps on at least one of a revised circuit design and a revised package design until a satisfactory result is achieved.

18. The apparatus of claim 17, wherein said means for repeating said steps carry out said repeating for at least said revised circuit design, and wherein said revised circuit design is revised to reduce temperature excursions at a periphery of said chip.

19. The apparatus of claim 16, wherein, in said means for carrying out said thermo-mechanical finite element analysis, said thermal stress considerations take into account local temperature fields.

* * * * *